(12) United States Patent
Wu et al.

(10) Patent No.: US 12,233,817 B2
(45) Date of Patent: Feb. 25, 2025

(54) FOOTSTEP TELESCOPING MECHANISM AND ELECTRIC FOOTSTEP ASSEMBLY

(71) Applicant: Zhejiang Xinxing Technology Co., Ltd., Wenzhou (CN)

(72) Inventors: Shouxian Wu, Wenzhou (CN); Botao Ni, Wenzhou (CN)

(73) Assignee: Zhejiang Xinxing Technology Co., Ltd., Wenzhou (CN)

( * ) Notice: Subject to any disclaimer, the term of this patent is extended or adjusted under 35 U.S.C. 154(b) by 362 days.

(21) Appl. No.: 17/984,410

(22) Filed: Nov. 10, 2022

(65) Prior Publication Data

US 2023/0339406 A1  Oct. 26, 2023

(30) Foreign Application Priority Data

Apr. 24, 2022  (CN) .......................... 202210435294.5

(51) Int. Cl.
*B60R 3/02* (2006.01)
(52) U.S. Cl.
CPC ..................................... *B60R 3/02* (2013.01)
(58) Field of Classification Search
CPC ....................................................... B60R 3/02
See application file for complete search history.

(56) References Cited

U.S. PATENT DOCUMENTS

| 11,338,737 | B2 * | 5/2022 | Godfrey | B60R 3/02 |
| 2017/0036606 | A1 * | 2/2017 | Du | B60R 3/02 |
| 2020/0369209 | A1 * | 11/2020 | Pantea | B62D 35/02 |

FOREIGN PATENT DOCUMENTS

| CN | 206141447 U | 8/2016 |
| CN | 109383392 A | 2/2019 |

\* cited by examiner

*Primary Examiner* — Bryan A Evans
(74) *Attorney, Agent, or Firm* — Birchwood IP (57) ABSTRACT

The present invention relates to the field of electric footsteps, and discloses a footstep telescoping mechanism and an electric footstep assembly. The footstep telescoping mechanism comprises main transmission arms, secondary transmission arms and lower swing arms, the main transmission arms, the secondary transmission arms, the lower swing arms and fixed seats form four-link hinge structures; and at least one of the three components of the main transmission arms, the secondary transmission arms and the lower swing arms is of the following structure, the structure comprises supporting frameworks Which are arranged at inner parts and used as reinforcing pieces, and body pieces which are formed on outer parts of the reinforcing pieces, the body pieces are made of non-metal materials, and the supporting frameworks and the body pieces are cast by a mold to form an integrated structure. The electric footstep has the advantages including light weight and good waterproofness.

10 Claims, 5 Drawing Sheets

FOOTSTEP TELESCOPING MECHANISM AND ELECTRIC FOOTSTEP ASSEMBLY

CROSS-REFERENCE TO RELATED APPLICATIONS

This is a U.S. patent application which claims the priority and benefit of Chinese Patent Application Number 202210435294.5, filed on Apr. 24, 2022, the disclosure of which is incorporated herein by reference in its entirety.

TECHNICAL FIELD

The present invention relates to the field of electric footsteps, and particularly relates to a motor for a vehicle electric footstep and an electric footstep.

BACKGROUND

An automobile electric footstep is an automobile footstep capable of automatically telescoping, and when an automobile door is opened, the electric footstep will automatically extend out, and the footstep will stop when running to a limit position; and when the automobile door is closed, the electric footstep will automatically retract to the bottom of an automobile, which brings a feeling of welcome etiquette. The electric footstep provides convenient service for getting on and off a high-chassis automobile, and particularly provides a practical and comfortable function for women, children or old people directly. Compared with a fixed footstep, the trafficability of an automobile body cannot be reduced, and a Chinese patent CN201811293017.5 discloses such an automobile electric footstep.

An existing automobile electric footstep is driven by a motor, an outer part of an existing wire is generally sleeved with a wire protection sleeve. However, an existing rubber waterproof plug is too short, consequently, an adhesive tape is not prone to being wound when mounting the wire protection sleeve, and even if the adhesive tape is wound, the wire protection sleeve will fall off. According to this solution, the rubber waterproof plug cannot be inserted into the wire protection sleeve, the wire protection sleeve can only be fixed by winding the adhesive tape, and the adhesive tape and the wire protection sleeve are prone to falling off or poor in waterproof performance.

A stamping piece is generally adopted for an existing motor shell, there is a large chamfer on the edge part, and a sealing ring is positioned on the inner side of the shell, so such structure easily meets water seepage phenomenon in actual use.

A Chinese patent CN201621015267.9 discloses an automatic telescoping footstep on the outer side of an automobile, the structure of which is a four-link hinge mechanism comprising a mounting seat, a lower swing arm, an inner transmission arm and an outer transmission arm, and the lower swing arm, the inner transmission arm and the outer transmission arm are fixedly connected to the footstep; the inner transmission arm is positioned on the left side of the outer transmission arm; one end of the inner transmission arm is hinged to the lower swing arm while the other end is hinged to the mounting seat; and one end of the outer transmission arm is hinged to the lower swing arm. A main transmission arm, a secondary transmission arm and the lower swing arm are all metal castings, which are large in weight and have shortages such as large noise, easy rusting, poor corrosion resistance, and short service life.

SUMMARY

In order to solve the above technical problems, the present invention provides the following technical solution:

A footstep telescoping mechanism includes main transmission arms, secondary transmission arms and lower swing arms, the main transmission arms, the secondary transmission arms, the lower swing arms and fixed seats form four-link hinge structures, the main transmission arms are used for being connected with motors and the main transmission arms are driven by the motors to swing, one end of each lower swing arm is connected with the corresponding fixed seat while the other end is connected with the corresponding lower swing arm, the main transmission arms, the secondary transmission arms and the lower swing arms are connected, and the main transmission arms and the secondary transmission arms swing to drive the lower swing arms to swing to extend out or retract; and at least one of the three components of the main transmission arms, the secondary transmission arms and the lower swing arms is of the following structure, the structure includes supporting frameworks which are arranged at inner parts and used as reinforcing pieces, and body pieces which are formed on outer parts of the reinforcing pieces, the body pieces are made of non-metal materials, and the supporting frameworks and the body pieces are cast by a mold to form an integrated structure.

Preferably, the supporting frameworks are made of iron materials or aluminum alloy materials; and the body pieces are made of plastic steel materials.

Preferably, the plastic steel materials are mixed materials of nylon and glass fibers; and the supporting frameworks are made of steel.

Preferably, the supporting frameworks include sheet-shaped supporting plates, shaft holes for allowing connecting shafts to penetrate through are formed in the body pieces, the supporting plates are positioned at two ends of the shaft holes, and the shaft holes penetrate through the body pieces and the supporting plates; and connecting holes are formed in the supporting frameworks, and the materials of the body pieces are formed in the connecting holes during casting to connect the body pieces on two sides of the supporting frameworks together.

Preferably, the lower swing arms include the supporting frameworks which are arranged at the inner parts and used as the reinforcing pieces, and the body pieces which are formed on the outer parts of the reinforcing pieces, the body pieces are made of the non-metal materials, the supporting frameworks and the body pieces are cast by the mold to form the integrated structure, boss structures are formed on the outer parts of the positions, at the lower swing arms, of the shaft holes of the body pieces, the shaft holes penetrate through the boss structures, the lower swing arms further include sealing caps, and the sealing caps are mounted in the boss structures to seal connecting shafts in the shaft holes; two sets of shaft holes are formed in the lower swing arms, one set of shaft holes are used for being connected with the main transmission arms through the connecting shafts, and the other set of shaft holes are used for being connected with the secondary transmission arms through the connecting shafts; the lower swing arms include supporting plates positioned at two ends of the shaft holes and further include reinforcing plates connected between the supporting plates, the reinforcing plates and the supporting plates are fixedly connected, and the body pieces are formed on the outer parts of the reinforcing plates and the supporting plates; and outward flanging structures are provided on edges of the outer parts of the reinforcing plates, and net-shaped structures playing a role in weight reduction and reinforcing ribs are provided on surfaces of the body pieces.

Preferably, the footstep telescoping mechanism further includes mounting seats, the mounting seats include side plates on two sides and top plates on top parts, the top plates and the side plates enclose assembly areas, and the main transmission arms and the secondary transmission arms are mounted in the assembly areas of the side plates and connected with the mounting seats through mounting holes formed in the side plates; and the footstep telescoping mechanism further includes connecting caps, clamping grooves are formed in outer side surfaces of the connecting caps, the connecting caps are clamped in the mounting holes through the clamping grooves, two ends of the connecting shafts for connecting the main transmission anus and the secondary transmission arms to the mounting seats are inserted into the connecting caps, and sealing caps are mounted at end parts of the connecting caps.

Preferably, each of the main transmission arms and the secondary transmission arms includes the supporting frameworks which are arranged at the inner parts and used as the reinforcing pieces, and the body pieces which are formed on the outer parts of the reinforcing pieces, the supporting frameworks of the main transmission arms and the secondary transmission arms each includes two supporting plates, the two supporting plates of each component are connected through the corresponding cast non-metal body pieces, each of the main transmission arms and the secondary transmission arms includes two shaft holes, one shaft hole is used for being connected with the corresponding mounting seat or an automobile body, and the other shaft hole is used for being connected with the corresponding lower swing arm.

An electric footstep assembly includes the above footstep telescoping mechanism and further includes driving motors fixedly mounted on the mounting seats, and a footstep mounted on the lower swing arms.

Preferably, each driving motor includes a motor body, and a wire used for being connected with a power source end or/and a control end, the wires extend out of the motor bodies through waterproof plugs, wire protection covers are detachably mounted on the waterproof plugs, and the wires extending out of the waterproof plugs are inserted into the wire protection covers; first concave-convex structures are provided on outer surfaces of the end parts of the waterproof plugs, second concave-convex structures matched with the first concave-convex structures are provided on inner side surfaces of the end parts of the wire protection covers, and the wire protection covers are fixedly connected with the waterproof plugs through cooperation of the second concave-convex structures and the first concave-convex structures; the first concave-convex structures are positioning rings provided on the outer surfaces of the waterproof plugs in a protruding mode, and a plurality of positioning rings are provided; the second concave-convex structures are positioning grooves formed in the wire protection covers and matched with the first concave-convex structures, and the positioning rings are sleeved with the positioning grooves; and a plurality of positioning grooves are provided, the structures between the positioning grooves form groove shaped structures on the outer parts of the wire protection covers, and the wire protection covers are plastic pieces which can be deformed under an external force.

Preferably, the waterproof plugs are rubber pieces, a limiting plate is provided at the other end of each waterproof plug, axial wire holes are formed in middle parts of the waterproof plugs, and the wire holes penetrate through front end surfaces and rear end surfaces of the waterproof plugs; the waterproof plugs are of a stepped shaft structure and include large shaft parts and small shaft parts, and positioning rings are provided on the outer side surfaces of the small shaft parts; the motor bodies include bottom covers and cylindrical shells, the shells are fixedly mounted on the bottom covers, the shells include cylindrical parts, fixing plates are provided on the edges of the end parts of the cylindrical parts, the fixing plates are fixedly mounted on the bottom covers through bolts, annular sealing grooves are formed in the bottom covers, the inner diameter of the sealing grooves is larger than the outer diameter of the cylindrical parts, and sealing rings are mounted in the sealing grooves; and limiting rings are provided on the rear parts of the bottom covers, and the edges of the inner sides of openings of the shells are clamped outside the limiting rings.

Through the above technical solution, the present invention has the following technical effects:

A swing arm mechanism of a novel structure composed of the plastic steel materials and the metal frameworks is designed in this solution; the swing arm mechanism utilizes a mature four-link mechanism to realize extending and retracting of the footstep; meanwhile, the weight of this assembly is reduced by about 70% compared with a conventional metal assembly, and moreover, the structural strength of the newly designed assembly can meet the requirements; compared with a metal structure assembly, this assembly is longer in service life, not prone to corrosion and low in noise; and all exposed parts of the swing arm structure assembly are made of non-metal materials, meanwhile, the connecting shafts and transmission shafts are sealed through the sealing caps, so that the dustproof and waterproof effects are good, and the service life is long.

In this solution, the designed motors can be fixedly matched with the wire protection covers, moreover, both are prevented from falling off, and an adhesive tape for winding is not needed. In addition, according to the motors, the sealing rings are positioned on the outer sides of the cylindrical bodies through the structural design of chassis and the shells, and thus the problem of leakage is avoided.

The reference numerals in the figures are marked as the following technical names:

1-supporting framework; 2-body piece; 3-supporting plate; 4-shaft hole; 5-through hole; 6-lower swing arm; 7-reinforcing plate; 8-sealing cap; 9-connecting hole; 91-flanging structure; 10-net-shaped structure; 11-main transmission arm; 12-secondary transmission arm; 15-boss structure; 16-connecting cap; 17-clamping groove; 18-mounting hole; 19-connecting shaft; 20-mounting seat; 301-motor body; 302-wire; 303-waterproof plug; 304-wire protection cover; 305-first concave-convex structure; 306-second concave-convex structure; 307-positioning ring; 309-positioning groove; 310-positioning plate; 311-wire hole; 312-large shaft part; 313-small shaft part; 314-bottom cover; 315-shell; 316-sealing groove; 317-limiting ring; 318-top plate; and 319-side plate.

DETAILED DESCRIPTION

The present invention will be described in further detail below with reference to the accompanying drawings and embodiments.

Embodiment 1

Figure 1:
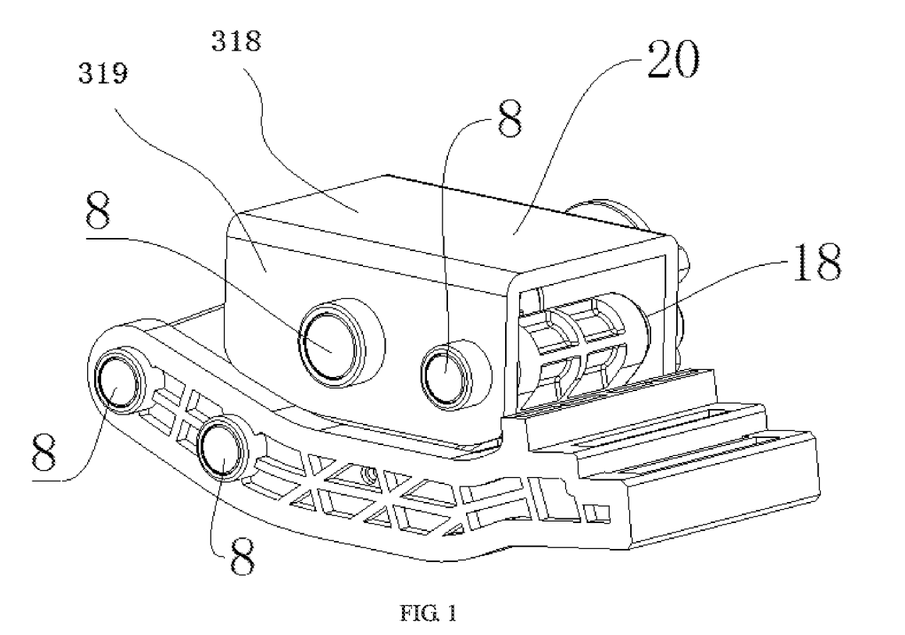
FIG. 1 is a schematic overall structure diagram of a mechanism.
Figure 2:
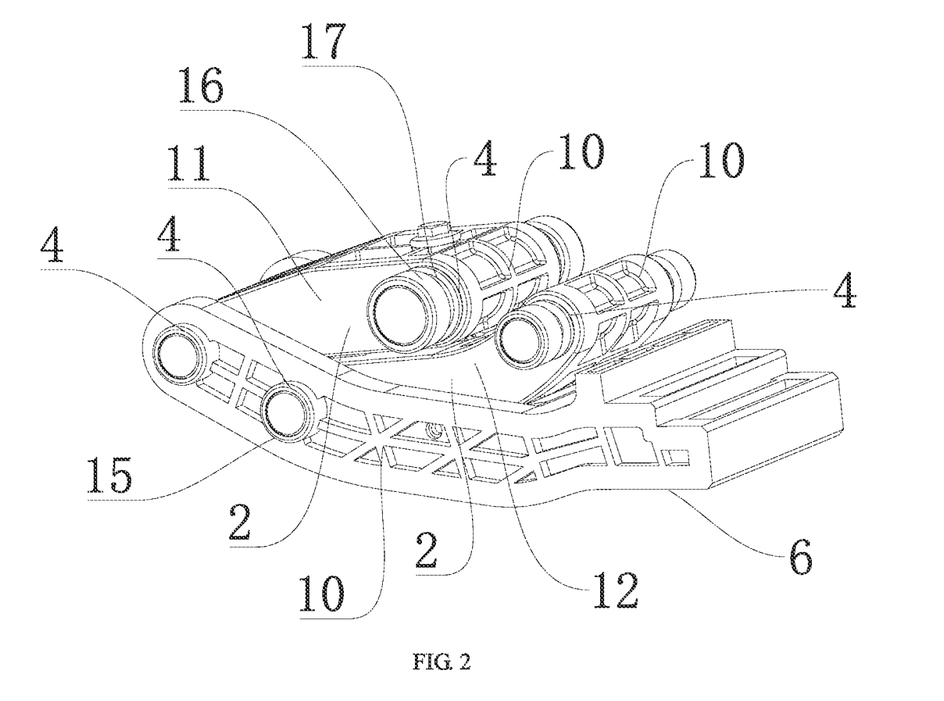
FIG. 2 is a schematic structure diagram of FIG. 1 without mounting seats.

A footstep 50 telescoping mechanism includes main transmission arms 11, secondary transmission arms 12 and lower swing arms 6, the main transmission arms 11, the secondary transmission arms 12, the lower swing arms 6 and fixed seats form four-link hinge structures, the main transmission arms 11 are used for being connected with motors and the main transmission arms 11 are driven by the motors to swing, one end of each lower swing arm 6 is connected with the corresponding fixed seat while the other end is connected with the corresponding lower swing arm 6, the main transmission arms 11, the secondary transmission arms 12 and the lower swing arms 6 are connected, and the main transmission arms 11 and the secondary transmission arms 12 swing to drive the lower swing arms 6 to swing to extend out or retract; and at least one of the three components of the main transmission arms 11, the secondary transmission arms 12 and the lower swing arms 6 is of the following structure, three components in this embodiment are of the following structure, the structure includes supporting frameworks 1 which are arranged at inner parts and used as reinforcing pieces, and body pieces 2 which are formed on outer parts of the reinforcing pieces, the body pieces 2 are made of non-metal materials, and the supporting frameworks 1 and the body pieces 2 are cast by a mold to form an integrated structure. In this embodiment, the main transmission arms 11, the secondary transmission arena 12 and the lower swing arms 6 are all of the above structure.

The working process of the four-link structures in this solution is as follows:

The motors drive the main transmission arms 11 to swing, the main transmission arms 11 are connected with the lower swing arms 6 through connecting shafts 19, and the lower swing arms 6 are connected with the secondary transmission arms 12 through the connecting shafts 19, so the secondary transmission arms 12 can swing at the same time, the lower swing arms 6 are driven by the main transmission arms 11 and the secondary transmission arms 12 to synchronously move, and the lower swing arms 6 extend out towards the inclined upper part of the outer side when extending out, and retract towards the inclined lower part of the inner side when retracting. This structure can save the space occupied by the footstep 50 to the greatest extent. The transmission structure is similar to the solution in Background Art.

According to the solution, a novel structural part is designed to overcome the shortages caused by a conventional metal transmission part. The shortages of the conventional metal transmission parts, such as large noise, large mass, low corrosion resistance and short service life are overcome. In this solution, a swing arm assembly with non-metal materials as main materials and metal materials as auxiliary materials is designed, with the adoption of this structure assembly, the weight of a product is greatly reduced, meanwhile, the connecting shafts 19 and transmission shafts can be sealed through sealing caps 8, so that the dustproof and waterproof effects are good, and the service life is long.

Figure 4:
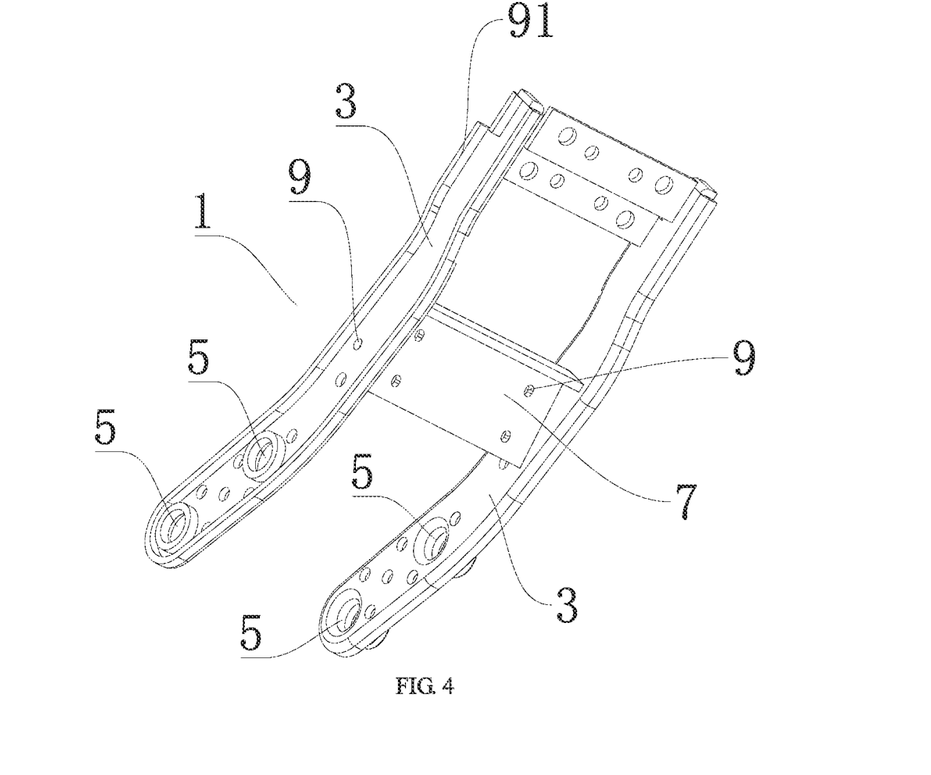
FIG. 4 is a schematic structure diagram of supporting frameworks of lower swing arms.
Figure 5:
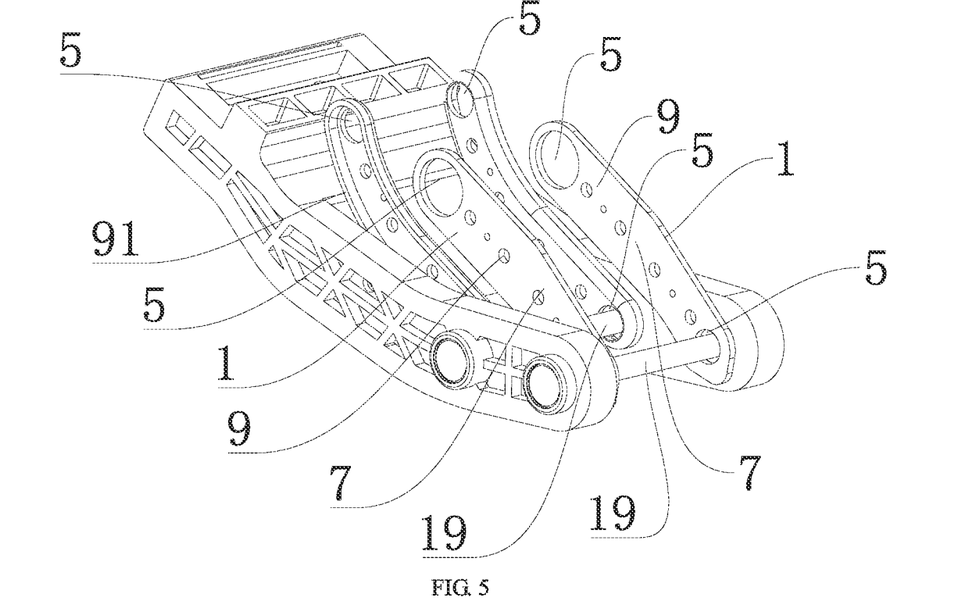
FIG. 5 is a schematic structure diagram of supporting frameworks of main transmission arms and secondary transmission arms.

In this solution, the supporting frameworks 1 are made of iron materials or aluminum alloy materials. In this solution, the supporting frameworks 1 are made of cold-rolled steel, specifically material HR340LA, which has high strength and are suitable for serving as frameworks to achieve a supporting effect, this material is the material described in this embodiment, and other high-strength metal materials which have the same effect as the present application are also within the protection range of the present application.

In order to reduce the weight and make the swing arm assembly have high strength, non-metal parts in the solution are made of plastic steel materials.

Specifically, the plastic steel materials are mixed materials of nylon and glass fibers. The materials selected in this solution are mixed materials composed of 70% of PA66 and 30% of GE The materials have high strength and low brittleness and have a quality similar to that of metal.

In this embodiment, the supporting frameworks 1 include sheet-shaped supporting plates 3, shaft holes 4 for allowing connecting shafts 19 to penetrate through are formed in each assembly, the supporting plates 3 are positioned at two ends of the shaft holes 4 and used for supporting the two ends of the shaft holes 4, through holes 5 are designed and formed in bodies through molds, and the through hole 5 and open holes of the supporting plates 3 are coaxially provided to form shaft hole 4 structures of each assembly. Since stress points of the swing arm assembly are generally the two ends of the shaft holes 4, the supporting frameworks 1 are designed at two ends of the shaft holes 4 in this solution, the supporting frameworks 1 can improve the strength of the assembly, and thus the problems including the assembly breaking under the condition of large stress are avoided.

The connecting shafts 19 among the main transmission arms 11, the secondary transmission arms 12 and the lower swing arms 6 are inserted into the shaft holes 4, and the lower swing arms 6 are hinged to the main transmission arms 11 and the secondary transmission arms 12.

In this embodiment, the main transmission arms 11, the secondary transmission arms 12 and the lower swing arms 6 all adopt the design of the structure composed of the supporting frameworks 1 which are arranged at the inner parts and used as the reinforcing pieces, and the body pieces 2 which are formed on outer parts of the reinforcing pieces. The swing arm assembly of such structure is not only suitable for an electric footstep 50 assembly structure in the Background Art, but also suitable for swing arms of other structural types.

Figure 3:
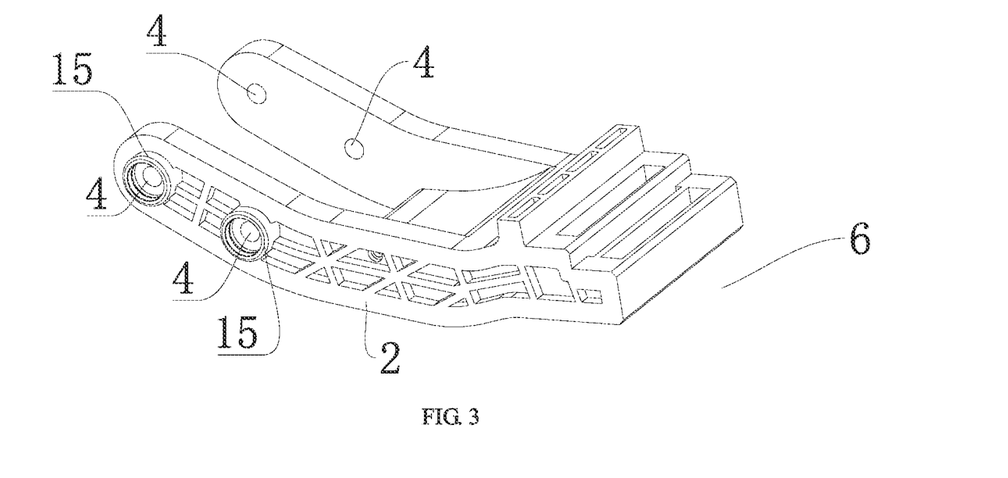
FIG. 3 is a schematic structure diagram of lower swing arms.

In this embodiment, the sealing caps 8 are provided at the two ends of the assembly shaft holes 4, and therefore the two ends of the connecting shafts 19 can be sealed through the sealing caps 8 after being mounted to achieve the dustproof and waterproof effects.

In this embodiment, connecting holes 9 are formed in the reinforcing plates 7, and the materials of the body pieces 2 are formed in the connecting holes 9 during casting to connect the body pieces 2 on the two sides of the reinforcing plates 7 together, so that the supporting frameworks 1 and the body pieces 2 form an integrated structure; and outward flanging structures 91 are provided on edges of the outer parts of the reinforcing plates 7, net-shaped structures 10 playing a role in weight reduction and reinforcing ribs are provided on the surfaces of the body pieces 2, and the grid architecture is formed through designed reinforcing ribs.

In this embodiment, the lower swing arms 6 include the supporting frameworks 1 which are arranged at the inner parts and used as the reinforcing pieces, and the body pieces 2 which are formed on the outer parts of the reinforcing pieces, the body pieces 2 are made of the non-metal materials; the supporting frameworks 1 and the body pieces 2 are cast by the mold to form the integrated structure, two shall holes 4 are formed in the lower swing arms 6 and are used for correspondingly connecting the main transmission arms 11 and the secondary transmission arms 12, boss structures 15 are formed on the outer parts of the positions, at the lower swing arms 6, of the shaft holes 4 of the body pieces 2, the shaft holes 4 penetrate through the middle part of the boss, and the lower swing arms further include sealing caps 8, and the sealing caps 8 are mounted in the boss to seal the connecting shafts 19 in the shaft holes 4. In the specific embodiment, due to the fact that it is needed to connect the lower swing arms to the main transmission arms 11 and the secondary transmission arms 12, in order to save space, the lower swing arms 6 include two connecting lugs, and the space used for assembling the main transmission arms 11 and the secondary transmission arms 12 are formed between the connecting lugs, the shaft holes 4 of the lower swing arms 6 are positioned in the connecting lugs, the shaft holes 4 of the lower swing arm 6 are divided into 2 sets, and each set of shaft holes 4 include two shaft holes which are connected to the two ends of the shaft holes 4 of the main transmission arms 11 and the secondary transmission arm 12 respectively. The main transmission arms 11 and the secondary transmission arras 12 are positioned between the connecting lugs, and the shaft holes 4 in the lower ends of the main transmission arms 11 and the secondary transmission arms 12 are connected with the main transmission arms 11 and the secondary transmission arm 12 respectively.

For the lower swing arms 6, the lower swing arms 6 include the supporting plates 3 positioned at the two ends of the shaft holes 4. Due to the fact that it is needed to jack up a vehicle during maintenance, a jack needs a force application point, and the load capable of being weighed is generally required to be 3 tons when the footstep 50 is jacked up, and in order to enable the strength of the swing arm assembly to meet the requirement, the lower swing arms 6 in this solution further include the reinforcing plates 7 connected between the supporting plates, and the reinforcing plates 7 are fixedly connected with the supporting plates 3. In this solution, welding fixing is adopted, the connecting holes 9 are formed in the reinforcing plates 7 and the supporting plates 3, and the body pieces 2 are cast on the outer parts of the reinforcing plates 7 and the supporting plates 3 to wrap the reinforcing plates 7 and the supporting plates 3, so that the body pieces 2 are formed on the outer parts of the reinforcing plate 7 and the supporting plates 3.

In this embodiment, the footstep telescoping mechanism further includes mounting seats 20, the main transmission arms 11, the secondary transmission arms 12 and driving motors are mounted on the mounting seats 20, and thus the integrated design of the transmission mechanisms is realized, and during mounting, it is only needed to fixedly mount the mounting seats 20 on an automobile frame. The mounting seats 20 include side plates 319 on two sides and top plates 318 on top parts, the top plates 318 and the side plates 319 enclose assembly areas, the main transmission arms 11 and the secondary transmission arms 12 are mounted in the assembly areas of the side plates 319 and connected with the mounting seats 20 through mounting holes 18 formed in the side plates 319.

Each of the main transmission arms 11 and the secondary transmission arms 12 includes the supporting frameworks 1 which are arranged at the inner parts and used as the reinforcing pieces, and the body pieces 2 which are formed on the outer parts of the reinforcing pieces, the supporting frameworks 1 of the main transmission arms 11 and the secondary transmission arms 12 each includes two supporting plates 3, the two supporting plates 3 of each component are connected through the corresponding cast non-metal body pieces 2, each of the main transmission arms 11 and the secondary transmission arms 12 includes two shaft holes 4, one shaft hole 4 is used for being connected with the corresponding mounting seat 20, and the other shaft hole 4 is used for being connected with the corresponding lower swing arm 6.

In order to realize sealing and non-exposure of all connecting shafts 19, the footstep telescoping mechanism further includes connecting caps 16, clamping grooves 17 are formed in outer side surfaces of the connecting caps 16, the connecting caps 16 are clamped in the mounting holes 18 through the clamping grooves 17, two ends of the connecting shafts 19 for connecting the main transmission arms 11 and the secondary transmission arms 12 to the mounting seats 20 are inserted into the connecting caps 16, and the sealing caps 8 are mounted at end parts of the connecting caps 16. According to the design of this structure, all the connecting shafts 19 are sealed, and the exposed parts are made of non-metal materials, so good dustproof and waterproof functions are realized, and the inner parts of the shaft holes 4 are made of the non-metal materials, thus the noise is low.

The connecting holes 9 are formed in the supporting frameworks 1, and the materials of the body pieces 2 are formed in the connecting holes 9 during casting to connect the body pieces 2 on two sides of the supporting frameworks (1) together; and the outward flanging structures 91 are arranged on the edges of the outer parts of the reinforcing plates 7, and the net-shaped structures 10 playing a role in weight reduction and the reinforcing ribs are arranged on the surfaces of the body pieces 2. In this embodiment, the flanging structures 91 are designed on the supporting frameworks 1 of the main transmission arms 11 and the secondary transmission arms 12, the flanging structures 91 provide boundaries for the net-shaped structures 10, the inner side surfaces of the main transmission arms 11 and the secondary transmission arms 12 are planes, and the net-shaped structures 10 are designed on the outer side surfaces.

In this solution, a swing arm mechanism of a novel structure composed of the plastic steel materials and the metal frameworks is designed, the swing arm mechanism utilizes a mature four-link mechanism to realize extending and retracting of the footstep 50, meanwhile, the weight of this assembly is reduced by about 70% compared with a conventional metal assembly, and moreover, the structural strength of the newly designed assembly can meet the requirements; compared with a metal structure assembly, this assembly is longer in service life, not prone to corrosion and low in noise; all exposed parts of the swing arm structure assembly are made of non-metal materials, meanwhile, the connecting shafts 19 and the transmission shafts are sealed through the sealing caps 8, so that the dustproof and waterproof effects are good, and the service life is long.

Embodiment 2

Figure 6:
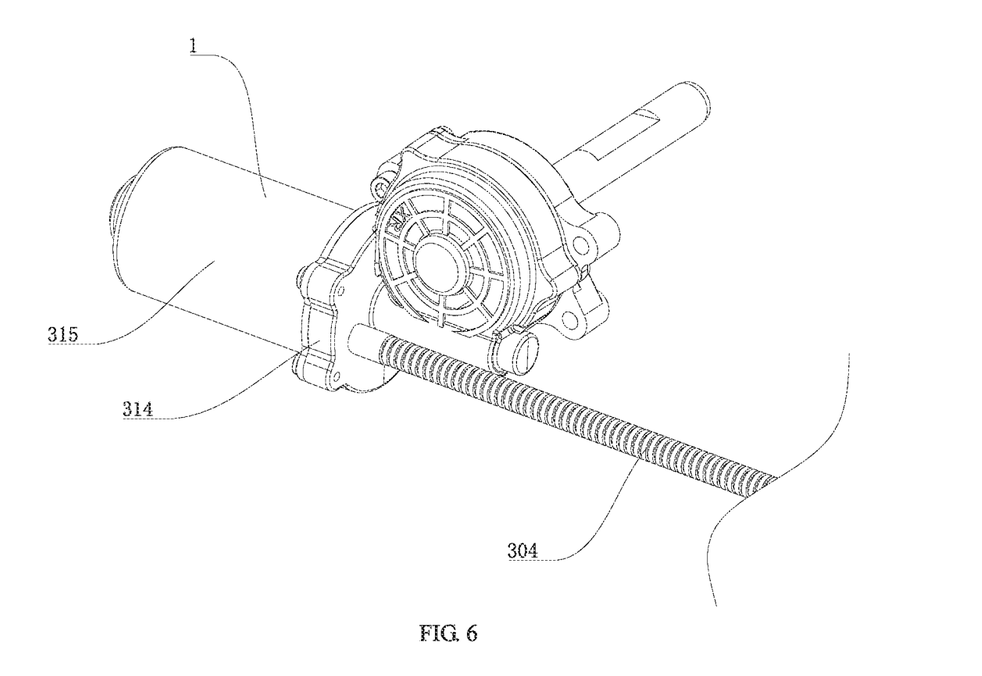
FIG. 6 is a schematic overall structure diagram of motors.
Figure 10:
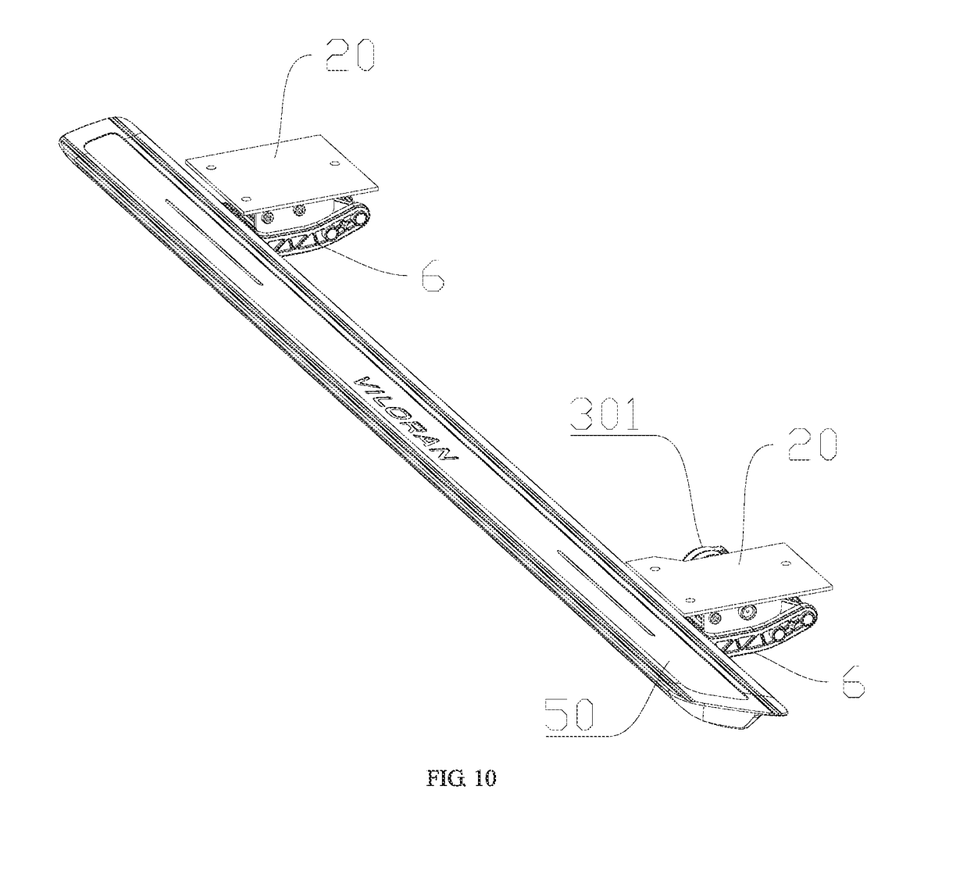
FIG. 10 is a schematic structure diagram of an elect footstep.

Based on Embodiment 1, this solution provides an electric footstep 50 assembly, the electric footstep 50 assembly includes driving motors, the driving motors are mounted on the side plates 319 of the mounting seats 20, fixing holes are formed in the top plates 318 of the mounting seats, and the footstep 50 assembly is fixedly connected with the automobile body through the fixing holes. The driving motors drive the main transmission arms 11 to rotate. Each driving motor includes a motor body 301, and a wire 302 used for being connected with a power source end or/and a control end, the wires 302 extend out of the motor bodies 301 through waterproof plugs 303, wire protection covers 304 are detachably mounted on the waterproof plugs 303, and the wires 302 extending out of the waterproof plugs 303 are inserted into the wire protection covers 304; and first concave-convex structures 305 are arranged on outer surfaces of the end parts of the waterproof plugs 303, second concave-convex structures 306 matched with the first concave-convex structures 305 are arranged on inner side surfaces of the end parts of the wire protection covers 304, and the wire protection covers 304 are fixedly connected with the waterproof plugs 303 through cooperation of the second concave-convex structures 306 and the first concave-convex structures 305. In this solution, the waterproof plugs 303 are fixedly mounted on the motor bodies 301 and the waterproof plugs 303 play a role in supporting and guiding, thus the wires 302 can be led out of the motor bodies 301. Meanwhile, the waterproof plugs 303 also play a role in connecting the wire protection covers 304, so the wire protection covers and the waterproof plugs can be directly connected, and the problem that a conventional adhesive tape is unreliable in connection and easy to fall off is avoided.

Figure 7:
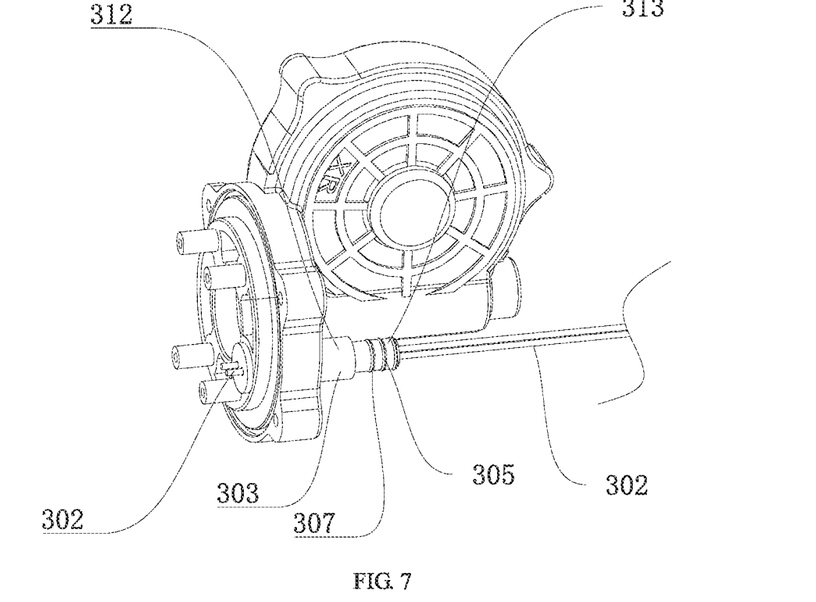
FIG. 7 is a schematic diagram of matching between bottom covers and waterproof plugs.
Figure 9:
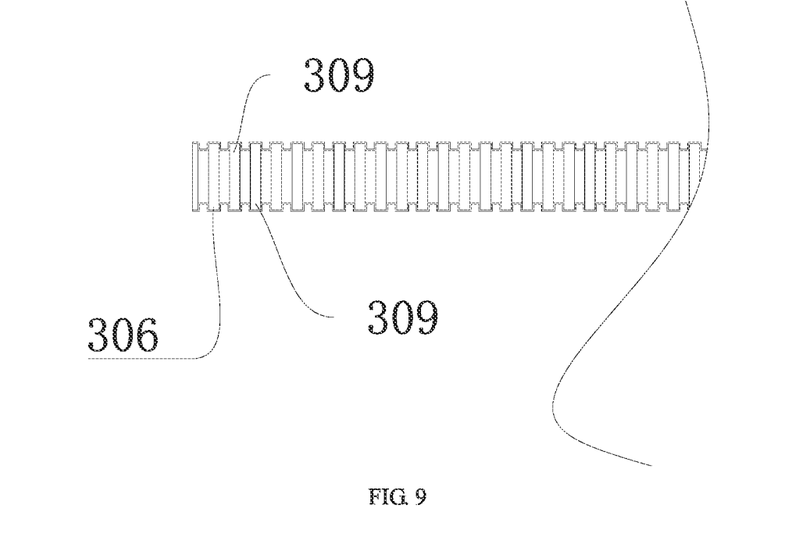
FIG. 9 is a sectional view of e protection covers.

In this embodiment, the first concave-convex structures 305 are positioning rings 307 arranged on the outer surfaces of the waterproof plugs 303 in a protruding mode, and a plurality of positioning rings 307 are provided; and the second concave-convex structures 306 are positioning grooves 309 formed in the wire protection covers 304 and matched with the first concave-convex structures 305, and the positioning rings 307 are sleeved with the positioning grooves 309. 3 positioning rings 307 are provided, and the positioning grooves 309 are annular grooves to be matched with the positioning rings 307. The annular grooves and the positioning rings are in interference fit.

In this embodiment, a plurality of positioning grooves 309 are provided, and the number of the positioning grooves is at least matched with the number of positioning rings 307. The structures between the positioning grooves 309 form groove-shaped structures on the outer parts of the wire protection covers 304, and the wire protection covers 304 are plastic pieces which can be deformed under an external force. The wire protection covers 304 in this embodiment are of a corrugated pipe structure, the positioning grooves 309 of corrugated pipes are clamped on the positioning rings 307 after deforming in the mounting process, and when the positioning rings 307 completely fall into the positioning grooves 309, the positioning rings and the positioning grooves are tightly connected.

In this embodiment, the waterproof plugs 303 are rubber pieces, a limiting plate 310 is arranged at the other end of each waterproof plug 303, axial wire holes 311 are formed in middle parts of the waterproof plugs 303, and the wire holes 311 penetrate through front end surfaces and rear end surfaces of the waterproof plugs 303.

In order to achieve attractive appearance and facilitate reinforcing and sealing, the waterproof plugs 303 are of a stepped shaft structure and include large shaft parts 312 and small shaft parts 313, and the positioning rings 307 are arranged on the outer side surfaces of the small shaft parts 313. The outer side surfaces of the mounted wire protection covers 304 are basically flush with the outer side surfaces of the large shaft parts 312, thereby facilitating later-period adhesive tape fixing and other reinforcing measures. In order to facilitate mounting and positioning of the shells 315, limiting rings 317 are arranged on the rear parts of the bottom covers 314, and the edges of the inner sides of openings of the shells 315 are clamped outside the limiting rings 317.

Figure 8:
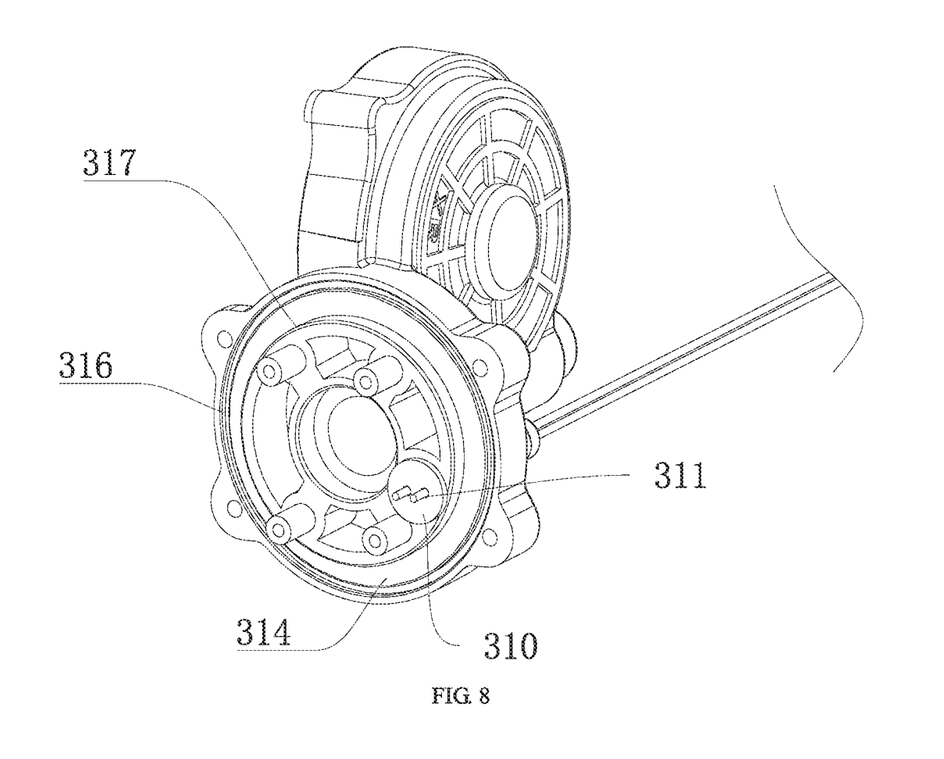
FIG. 8 is a schematic structure diagram of inner sides of bottom covers.

In this embodiment, the motor bodies 301 include bottom covers 314 and cylindrical shells 315, the shells 315 are fixedly mounted on the bottom covers 314, the shells 315 include cylindrical parts, fixing plates are arranged on the edges of the end parts of the cylindrical parts, the fixing plates are fixedly mounted on the bottom covers 314 through bolts, annular sealing grooves 316 are formed in the bottom covers 314, the inner diameter of the sealing grooves 316 is larger than the outer diameter of the cylindrical parts, and sealing rings are mounted in the sealing grooves 316. By adopting this structure, the problem of easiness in leaking since the conventional sealing rings are positioned on the inner sides of the shells 315 is avoided.

In this solution, the designed motors can be fixedly matched with the wire protection covers 304, moreover, both are prevented from falling off, and an adhesive tape for winding is not needed. In addition, according to the motors, the sealing rings are positioned on the outer sides of the cylindrical bodies through the structural design of chassis and the shells 315, and thus the problem of leakage is avoided. The footstep 50 is fixedly arranged on the lower swing arms 6.

Embodiment 3

An electric footstep 50 is provided with the motors in Embodiment 1.

Embodiment 4

An automobile is provided with the electric footstep 50 in Embodiment 2.

What is claimed is:
1. A footstep telescoping mechanism, comprising main transmission arms (11), secondary transmission arms (12) and lower swing arms (6), wherein the main transmission arms (11), the secondary transmission arms (12), the lower swing arms (6) and fixed seats form four-link hinge structures, the main transmission arms (11) are used for being connected with motors and the main transmission arms (11) are driven by the motors to swing, one end of each lower swing arm (6) is connected with the corresponding fixed seat while the other end is connected with the corresponding lower swing arm (6), the main transmission arms, the secondary transmission arms (12) and the lower swing arms (6) are connected, and the main transmission arms (11) and the secondary transmission arms (12) swing to drive the lower swing arms (6) to swing to extend out or retract; and at least one of the three components of the main transmission arms (11), the secondary transmission arms (12) and the lower swing arms (6) is of the following structure, the structure comprises supporting frameworks (1) which are arranged at inner parts and used as reinforcing pieces, and body pieces (2) which are formed on outer parts of the reinforcing pieces, the body pieces (2) are made of non-metal materials, and the supporting frameworks (1) and the body pieces (2) are cast by a mold to form an integrated structure.

2. The footstep telescoping mechanism according to claim 1, wherein the supporting frameworks (1) are made of iron materials or aluminum alloy materials; and the body pieces (2) are made of plastic steel materials.

3. The footstep telescoping mechanism according to claim 1, wherein the plastic steel materials are mixed materials of nylon and glass fibers; and the supporting frameworks (1) are made of steel.

4. The footstep telescoping mechanism according to claim 1, wherein the supporting frameworks (1) comprise sheet-shaped supporting plates (3), shaft holes (4) for allowing connecting shafts (19) to penetrate through are formed in the body pieces (2), the supporting plates (3) are positioned at two ends of the shaft holes (4), and the shaft holes (4) penetrate through the body pieces (2) and the supporting plates (3); and connecting holes (9) are formed in the supporting frameworks (1), and the materials of the body pieces (2) are formed in the connecting holes (9) during casting to connect the body pieces (2) on two sides of the supporting frameworks (1) together.

5. The footstep telescoping mechanism according to claim 4, wherein the lower swing arms (6) comprise the supporting frameworks (1) which are arranged at the inner parts and used as the reinforcing pieces, and the body pieces (2) which are formed on the outer parts of the reinforcing pieces, the body pieces (2) are made of the non-metal materials, the supporting frameworks (1) and the body pieces (2) are cast by the mold to form the integrated structure, boss structures (15) are formed on the outer parts of the positions, at the lower swing arms (6), of the shaft holes (4) of the body pieces (2), the shaft holes (4) penetrate through the boss structures (15), the lower swing arms further comprise sealing caps (8), and the sealing caps (8) are mounted in the boss structures (15) to seal connecting shafts (19) in the shaft holes (4); two sets of shaft holes (4) are formed in the lower swing arms (6), one set of shaft holes (4) are used for being connected with the main transmission arms (11) through the connecting shafts, and the other set of shaft holes (4) are used for being connected with the secondary transmission arms (12) through the connecting shafts; the lower swing arms (6) comprise the supporting plates (3) positioned at the two ends of the shaft holes (4) and further comprise reinforcing plates (7) connected between the supporting plates, the reinforcing plates (7) and the supporting plates (3) are fixedly connected, and the body pieces (2) are formed on the outer parts of the reinforcing plates (7) and the supporting plates (3); and outward flanging structures (91) are provided on edges of the outer parts of the reinforcing plates (7), and net-shaped structures (10) playing a role in weight reduction and reinforcing ribs are provided on surfaces of the body pieces (2).

6. The footstep telescoping mechanism according to claim 1, wherein the footstep telescoping mechanism further comprises mounting seats (20), the mounting seats (20) comprise side plates (319) on two sides and top plates (318) on top parts, the top plates (318) and the side plates (319) enclose assembly areas, and the main transmission arms (11) and the secondary transmission arms (12) are mounted in the assembly areas of the side plates (319) and are connected with the mounting seats (20) through mounting holes (18) formed in the side plates (319); and the footstep telescoping mechanism further comprises connecting caps (16), clamping grooves (17) are formed in outer side surfaces of the connecting caps (16), the connecting caps (16) are clamped in the mounting holes (18) through the clamping grooves (17), two ends of the connecting shafts (19) for connecting the main transmission arms (11) and the secondary transmission arms (12) to the mounting seats (20) are inserted into the connecting caps (16), and sealing caps (8) are mounted at end parts of the connecting caps (16).

7. The footstep telescoping mechanism according to claim 1, wherein each of the main transmission arms (11) and the secondary transmission arms (12) comprises the supporting frameworks (1) which are arranged at the inner parts and used as the reinforcing pieces, and the body pieces (2) which are formed on the outer parts of the reinforcing pieces, the supporting frameworks (1) of the main transmission arms (11) and the secondary transmission arms (12) each comprises two supporting plates (3), the two supporting plates (3) of each component are connected through the corresponding cast non-metal body pieces (2), each of the main transmission arms (11) and the secondary transmission arms (12) comprises two shaft holes (4), one shaft hole (4) is used for being connected with the corresponding mounting seat or an automobile body, and the other shaft hole (4) is used for being connected with the corresponding lower swing arm (6).

8. An electric footstep assembly, comprising the footstep telescoping mechanism according to claim 6, wherein the electric footstep assembly further comprises driving motors fixedly mounted on the mounting seats (20), and a footstep (50) mounted on the lower swing arms (6).

9. The electric footstep assembly according to claim 8, wherein each driving motor comprises a motor body (301), and a wire (302) used for being connected with a power source end or/and a control end, the wires (302) extend out of the motor bodies (301) through waterproof plugs (303), wire protection covers (304) are detachably mounted on the waterproof plugs (303), and the wires (302) extending out of the waterproof plugs (303) are inserted into the wire protection covers (304); first concave-convex structures (305) are provided on outer surfaces of the end parts of the waterproof plugs (303), second concave-convex structures (306) matched with the first concave-convex structures (305) are provided on inner side surfaces of the end parts of the wire protection covers (304), and the wire protection covers (304) are fixedly connected with the waterproof plugs (303) through cooperation of the second concave-convex structures (306) and the first concave-convex structures (305); the first concave-convex structures (305) are positioning rings (307) provided on the outer surfaces of the waterproof plugs (303) in a protruding mode, and a plurality of positioning rings (307) are provided; the second concave-convex structures (306) are positioning grooves (309) provided in the wire protection covers (304) and matched with the first concave-convex structures (305), and the positioning rings (307) are sleeved with the positioning grooves (309); and a plurality of positioning grooves (309) are provided, the structures between the positioning grooves (309) form groove-shaped structures on the outer parts of the wire protection covers (304), and the wire protection covers (304) are plastic pieces which can be deformed under an external force.

10. The electric footstep assembly according to claim 9, wherein the waterproof plugs (303) are rubber pieces, a limiting plate (310) is provided at the other end of each waterproof plug (303), axial wire holes (311) are provided in middle parts of the waterproof plugs (303), and the wire holes (311) penetrate through front end surfaces and rear end surfaces of the waterproof plugs (303); the waterproof plugs (303) are of a stepped shaft structure and comprise large shaft parts (312) and small shaft parts (313), and the positioning rings (307) are provided on the outer side surfaces of the small shaft parts (313); the motor bodies (301) comprise bottom covers (314) and cylindrical shells (315), the shells (315) are fixedly mounted on the bottom covers (314), the shells (315) comprise cylindrical parts, fixing plates are provided on the edges of the end parts of the cylindrical parts, the fixing plates are fixedly mounted on the bottom covers (314) through bolts, annular sealing grooves (316) are formed in the bottom covers (314), the inner diameter of the sealing grooves (316) is larger than the outer diameter of the cylindrical parts, and sealing rings are mounted in the sealing grooves (316); and limiting rings (317) are provided on the rear parts of the bottom covers (314), and the edges of the inner sides of openings of the shells (315) are clamped outside the limiting rings (317).

\* \* \* \* \*